United States Patent Office 3,318,938
Patented May 9, 1967

3,318,938
ARYL 2-CYANOALLYL-DITHIOCARBAMATES
George R. Haynes, Modesto, Calif., assignor to Shell Oil Company, New York, N.Y., a corporation of Delaware
No Drawing. Filed Aug. 7, 1964, Ser. No. 388,285
7 Claims. (Cl. 260—455)

This application is a continuation-in-part of Serial No. 200,627, filed on June 7, 1962, now U.S. Patent No. 3,234,087.

This invention relates to novel aryl dithiocarbamates. In particular the invention is concerned with a novel class of aryl dithiocarbamates characterized by a cyanoallyl moiety bonded to the nitrogen atom. These novel compounds have been found useful in the prevention and treatment of disease caused by microorganisms. These compounds are of special interest as coccidiostats and as soil fungicides to control soil-borne diseases of plants.

Coccidiosis is a common and widespread poultry disease caused by microorganisms, that is, several species of protozoan parasites of the genus Eimeria, such as *E. tenella, E. necatrix, E. acervuline, E. maxima, E. hagani* and *E. brunetti*. *E. tenella* is the causative agent of a severe and often fatal infection of the caeca of chickens, which is manifested by severe and extensive hemorrhage, accumulation of blood in the caeca, and the passage of blood in the droppings. *E. necatrix* attacks the small intestine of the chick causing what is known as intestinal coccidiosis. Related species of coccidia such as *E. meleagridis* and *E. adenoides* are caustive organisms of coccidiosis in turkeys. When left untreated, the severe forms of coccidiosis lead to poor weight gain, reduced feed efficiency and high mortality in fowl. The elimination or control of this disease is, therefore, of paramount importance to the poultry raising industry. Coccidiosis also effects animals as well as poultry, for example, *E. zurnii, E. bovis* and *E. ellipsoidalis* are species of coccidia which have been described from cattle. There also appear to be at least seven valid species of coccidiosis in sheep and goats and at least six species of coccidiosis in swine. So it may be seen that there is also a need for effective coccidiostats in the animal raising industry.

It has now been found that certain aryl aliphatic-dithiocarbamates, more particularly, aryl esters of 2-cyanoallyl-dithiocarbamic acids, are very active against protozoa which cause coccidiosis, especially in poultry. These compounds may also be useful in the treatment of coccidiosis in animals. As discussed more fully hereinbelow the development of coccidiosis is prevented when small amounts of these esters are fed to poultry.

The aryl esters of 2-cyanoallyl-dithiocarbamic acid have further been found to be excellent soil fungicides. Members of the class have outstanding fungicidal properties, especially against many genera of organisms causing rotting of roots. When incorporated into the soil, they have been found to protect crops against these destructive organisms without themselves causing injury to the plants.

The aryl (substituted and unsubstituted) esters of 2-cyanoallyl-dithiocarbamic acids of this invention may be represented by the formula:

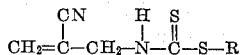

wherein R represents aryl of 6–14 carbon atoms. The aryl may be substituted or unsubstituted. When substituted, each substituent may be selected from one to a plurality of middle halogen (bromine or chlorine), alkyl of 1–5 carbon atoms, alkoxy of 1–5 carbon atoms, hydroxy, nitro, amino (—NH₂), monoalkylamino of 1–4 carbon atoms or dialkylamino of 2–8 carbon atoms.

Particularly preferred compounds, because of their effectiveness as soil fungicides, are those compounds wherein R represents unsubstituted phenyl, chlorophenyl, bromophenyl, tolyl, or isopropyl phenyl. Especially active as soil fungicides, and therefore preferred, are the dithiocarbamates wherein R is alkylphenyl where the alkyl group is straight-chain or branched and contains from 1 to 10 carbon atoms. Still another preferred class because of high activity to soil organisms are those compounds of the invention where R is middle halo- (chloro- or bromo-) phenyl. Especially active compounds are where R is phenyl, o-methylphenyl and p-chlorophenyl, respectively.

Representative aryl esters of aliphatic-dithiocarbamic acids, i.e., aryl cyanoallyl thiocarbamates, include, for example, 2-chlorophenyl (2-cyanoallyl)-dithiocarbamate;
3-chlorophenyl (2-cyanoallyl)-dithiocarbamate;
2,4-dichlorophenyl (2-cyanoallyl)-dithiocarbamate;
2,6-dichlorophenyl (2-cyanoallyl)-dithiocarbamate;
2-bromophenyl (2-cyanoallyl)-dithiocarbamate;
2,6-dibromophenyl (2-cyanoallyl)-dithiocarbamate;
2-chloro-6-bromophenyl (2-cyanoallyl)-dithiocarbamate;
4-tolyl (2-cyanoallyl)-dithiocarbamate;
3-tolyl (2-cyanoallyl)-dithiocarbamate;
2-methoxyphenyl (2-cyanoallyl)-dithiocarbamate;
4-methoxylphenyl (2-cyanoallyl)-dithiocarbamate;
2,6-dimethoxyphenyl (2-cyanoallyl)-dithiocarbamate;
4-ethoxyphenyl (2-cyanoallyl)-dithiocarbamate;
4-hydroxyphenyl (2-cyanoallyl)-dithiocarbamate;
2,6-dihydroxyphenyl (2-cyanoallyl)-dithiocarbamate;
4-nitrophenyl (2-cyanoallyl)-dithiocarbamate;
3,5-dinitrophenyl (2-cyanoallyl)-dithiocarbamate;
2,4,5-trinitrophenyl (2-cyanoallyl)-dithiocarbamate;
4-aminophenyl (2-cyanoallyl)-dithiocarbamate;
2-naphthyl (2-cyanoallyl)-dithiocarbamate;
4,8-dichloro-2-naphthyl (2-cyanoallyl)-dithiocarbamate;
3,6-dinitro-2-naphthyl (2-cyanoallyl)-dithiocarbamate;
2-anthryl (2-cyanoallyl)-dithiocarbamate;
9-methoxy-2-anthryl (2-cyanoallyl)-dithiocarbamate;
and the like.

These aryl esters of 2-cyanoallyl-dithiocarbamic acids are conveniently employed as coccidiostats by incorporating them in the feed of the animal to be treated. Alternatively or in addition, they may also be given dissolved or suspended in the animal's drinking water. The aryl 2-cyanoallyl-dithiocarbamates may be intimately dispersed in or intimately admixed with an inert edible carrier or diluent. By an inert edible carrier or diluent is meant one that is nonreactive with the active compounds and that may be administered with safety to the animal(s) to be treated. The carrier or diluent is preferably one that is or may be an ingredient of the animal's feed.

Very low levels of aryl 2-cyanoallyl-dithiocarbamates in animal feed are sufficient to afford the animal(s) good protection against coccidiosis. Preferably the compound is administered to animals—for example, chickens, in an amount equal to about 50 p.p.m. to about 600 p.p.m. of the daily feed intake. Optimum results are obtained by feeding at a level of about 200 p.p.m. to about 400 p.p.m. of the finished feed. For therapeutic treatment of an established coccidial infection, higher amounts of the dithiocarbamate, i.e., up to about 10 p.p.m. to about 1000 p.p.m. weight of the feed consumed, may be employed. The most advantageous dosage level will, of course, vary somewhat with particular circumstances such as the type and severity of the coccidial infection to be treated.

The coccidiostat is uniformly dispersed in the animal feed by suitable mixing or blending procedures. The finished feed is one that contains the necessary sources of fat, protein, carbohydrate, minerals, vitamins and other nutritional factors as well as the dithiocarbamate.

In the above discussion of this invention, emphasis has been placed on solid compositions wherein the active ingredient is mixed with an edible carrier in a feed supplement, in a so-called premix or in the final feedstuff. This is the preferred method of administering compounds of this invention. An alternate method of treatment is to dissolve or suspend the dithiocarbamate in the drinking water of the poultry. The quantity of this coccidiostat which may be administered in this fashion is, of course, limited by the solubility of the product in water or by the quantity that may be suspended in the water without undue settling. Emulsifiers or surface active agents may be employed for this latter purpose.

This invention is not limited to coccidiostatic compositions having only one aryl 2-cyanoallyl-dithiocarbamate as the sole active ingredient. Also contemplated within its scope is what might be called "combined treatment" where two or more of the coccidiostats of this invention are used together or where one, two, or more of the coccidiostats of this invention are administered concurrently with other coccidiostats. For such purposes, compositions may be prepared containing, for example, phenyl 2-cyanoallyl-dithiocarbamate and p-chlorophenyl 2-cyanoallyl-dithiocarbamate together, or phenyl 2-cyanoallyl-dithiocarbamate admixed with one or more other known coccidiostats such as sulfaquinoxaline, 4,4' - dinitrocarbanilide - 2 - hydroxy-4,6 - dimethylpyrimidine complex, 3,3' - dinitrodiphenyldisulfide, arsanilic acid, 3-amino-4-hydroxy-phenylarsonic acid, 5-nitrofurfural semicarbazone, and the like.

It will likewise be understood by those skilled in this art that special feed supplement formulations and finished feeds containing vitamins, antibiotics, growth-promoting agents and other nutritional substances may include the aryl 2-cyanoallyl-dithiocarbamates of this invention. A typical poultry feed of this type is the following:

| Ingredient: | Amount/lb. of supplement, mg. |
|---|---|
| Riboflavin | 0.64 |
| DL-calcium pantothenate | 2.10 |
| Niacin | 3.67 |
| Choline chloride | 50.00 |
| Vitamin $B_{12}$ concentrate | 1.30 |
| Procaine penicillin | 0.84 |
| Vitamin A (100,000 u./g.) | 3.38 |
| Vitamin $D_3$ (200,000 u./g.) | 0.68 |
| Arsanilic acid | 18.36 |
| Butylated hydroxy toluene | 23.15 |
| DL-methionine | 23.15 |
| Phenyl 2-cyanoallyl-dithiocarbamate | 100.0 |
| Distillers' grains to 1 pound. | |

An especially active coccidiostat of this invention is phenyl 2-cyanoallyl-dithiocarbamate. This compound has been effective in controlling *E. tenella* in test chicks when administered in feed at a concentration of about 200 parts per million. For example, Table I hereinafter compares the known coccidiostat, sulfaquinoxaline with phenyl 2-cyanoallyl-dithiocarbamate.

Briefly, the novel aryl cyanoallyl thiocarbamates can be prepared by reacting 2-cyanoallylisothiocyanate with a corresponding aryl or substituted aryl mercaptan according to the following equation:

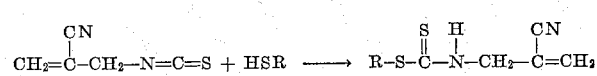

where R is as hereinbefore defined.

The following specific examples illustrate the preparation of typical aryl cyanoallyl-dithiocarbamates within the purview of this invention.

EXAMPLE I.—*p-Chlorophenyl (2-cyanoallyl)-dithiocarbamate*

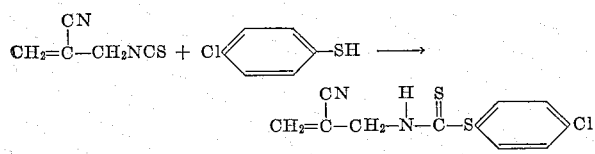

To a solution of 0.1 mole of p-chlorobenzenethiol in 25 milliliters of ether in the presence of 5 milliliters of pyridine was added 0.1 mole of 2-cyanoallylisothiocyanate. The reaction mixture was stirred and kept between 20–35° C for 1 hour. The reaction mixture was filtered and the desired product was recrystallized from methanol. Yield was 80%. The structure was established by elemental analysis, percent by weight: (M.P. 146–147° C.). Calculated, Cl, 13.2, S, 23.8. Found, Cl, 13.4, S, 23.0.

EXAMPLE II.—*p-Bromophenyl (2-cyanoallyl)-dithiocarbamate*

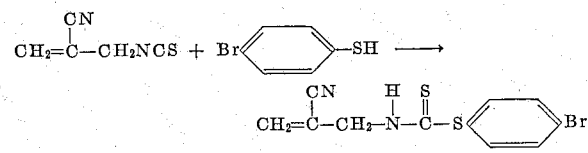

Using p-bromobenzenethiol as a reactant the desired dithiocarbamate was obtained in 90% yield using a procedure similar to that outlined in Example I. The elemental analysis was, percent by weight: (M.P. 132–133° C.). Calculated, N, 9.0, Br, 25.6. Found, N, 9.3, Br, 23.7.

EXAMPLE III.—*o-Tolylphenyl (2-cyanoallyl)-dithiocarbamate*

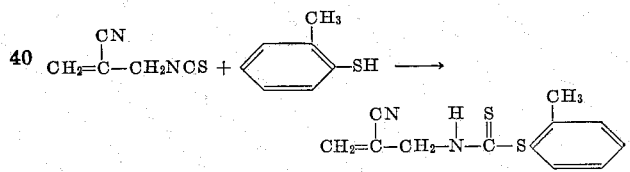

Using o-methylbenzenethiol as a reactant the desired dithiocarbamate was obtained in 43% yield using a procedure similar to that outlined in Example I. The elemental analysis was, percent by weight: (M.P. 88–91° C.). Calculated, N, 11.3, S, 25.8. Found, N, 11.8, S, 24.8.

EXAMPLE IV.—*o-Cumenylphenyl (2-cyanoallyl)-dithiocarbamate*

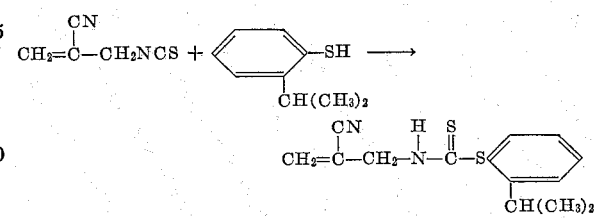

Using o-isopropylbenzenethiol as a reactant the desired dithiocarbamate was obtained in 50% yield using a procedure similar to that outlined in Example I. The elemental analysis was, percent by weight: (M.P. 111–113° C.). Calculated, N, 10.1, S, 23.2. Found, N, 9.9, S, 22.8.

EXAMPLE X

The following specific examples illustrate compositions containing the novel active ingredients of this invention. Animal feed supplements having the following compositions are prepared by intimately mixing, for example, the 2-cyanoallyl dithiocarbamate and the particular edible solid diluent or diluents:

| | Lbs. |
|---|---|
| Phenyl 2-cyanoallyl-dithiocarbamate | 7.5 |
| Distillers' dried grains | 92.5 |
| | |
| Phenyl 2-cyanoallyl-dithiocarbamate | 5.0 |
| Soybean mill feed | 50.0 |
| Fine soya grits | 45.0 |
| | |
| Phenyl 2-cyanoallyl-dithiocarbamate | 10.0 |
| Molasses solubles | 90.0 |
| | |
| Phenyl 2-cyanoallyl-dithiocarbamate | 15.0 |
| Corn distillers' grains | 55.0 |
| Corn germ meal | 30.0 |
| | |
| p-chlorophenyl 2-cyanoallyl-dithiocarbamate | 20.0 |
| Wheat shorts | 30.0 |
| Distillers' dried grains | 50.0 |
| | |
| o-tolyl 2-cyanoallyl-dithiocarbamate | 25.0 |
| Corn distillers' dried grans | 75.0 |
| | |
| 2,4,5-trichlorophenyl 2-cyanoallyl-dithiocarbamate | 40.0 |
| Corn meal | 60.0 |
| | |
| p-aminophenyl 2-cyanoallyl-dithiocarbamate | 10.0 |
| Nicarbazin | 15.0 |
| Corn distillers' dried grains | 75.0 |

These supplements are made by mechanical milling or mixing of the ingredients to insure uniform distribution of the active compound.

The following specific example illustrated the effectiveness of the coccidiostats of this invention.

*EXAMPLE VI.—Phenyl (2-cyanoallyl)-dithiocarbamate in chick diet*

Groups of 10-day old chicks were fed a mash diet containing 200 p.p.m. of phenyl 2-cyanoallyl-dithiocarbamate uniformly dispersed in the feed. After having been on this ratio for 24 hours, each bird was inoculated with 1 cc. of sporulated oocysts of *E. tenella,* other groups of 10-day old chicks were fed a similar mash diet containing no phenyl 2-cyanoallyl-dithiocarbamate. These were also infected after 24 hours and served as controls. Still other groups of 10-day old chicks were fed the mash diet free of phenyl 2-cyanoallyl-dithiocarbamate and were not infected with coccidiosis. These served as normal controls.

The experiments were completed on the seventh day after injection. During the seven-day period the infected birds were observed for clinical evidence of coccidiosis. The surviving birds were weighed, sacrificed and examined for caecal coccidiosis.

The following results were obtained:

quinoxaline. It also may be seen that phenyl (2-cyanoallyl)-dithiocarbamate at 200 p.p.m. showed a weight increase of 50 g./bird with only a small amount of bleeding on the 5th day.

The compounds of this invention are active soil fungicides. They can be formulated in any of the ways known to the pesticide formulation art. For example they can be formulated as liquids in the form of solutions, suspensions, emulsifiable concentrates or slurries or as solid formulations, as dusts, wettable powders, granules, or pellets. They can be formulated as dry seed-treating agents which contain special adhesive agents.

Useful solutions for application by spraying onto the soil can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl acid sulfonates, long chain alkyl sulfonates, phenol ethylene oxide condensates, ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the compounds of the present invention can be employed as an aerosol, as by dispersing the same into the atmosphere by means of a compressed gas.

The concentration of the compound to be used with the above carriers is dependent upon many factors, including the carrier employed, the method and conditions of application, and the fungus complex to be controlled, a proper consideration and resolution of these factors being within the skill of those versed in the fungicide art. In general, however, the compound of this invention is effective in concentrations of from about 0.01% to 0.5% based upon the total weight of the composition, though under some circumstances as little as about 0.00001% or as much as 2% or even more of the compound can be employed with good results from fungicide standpoint. Concentrates suitable for sale for dilution in the field may contain as much as 25–50% by weight, or even more, of the fungicide.

When employed as fungicide, the compound of this invention can be employed either as the sole toxic ingredient of the pesticidal composition or can be employed in conjunction with insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl-p-nitrophenyl thiophosphate, dimethyl 2,2-dichlorovinyl phosphate, 1,2-dibromo-2,2-dichloroethyl dimethyl phosphate, azobenzene, and the various compounds of arsenic, lead and/or fluorine.

TABLE I

| | Concentration in Feed (p.p.m.) | Mortality (percent) | Weight Increase per bird (grams) | Evidence of Coccidiosis, day bleeding after inoculation [1] | | |
|---|---|---|---|---|---|---|
| | | | | 4th | 5th | 6th |
| Inoculated chick | 0 | 50 | | 0 | M | H |
| Non-inoculated chick | 0 | 0 | 49 | 0 | 0 | 0 |
| Sulfaquinoxaline | 125 | 25 | 33 | 0 | M | H |
| Sulfaquinoxaline | 125 | 12 | 23 | 0 | S | M |
| Phenyl (2-cyanoallyl))-dithiocarbamate | 200 | 0 | 50 | 0 | S | 0 |

[1] Amount of Bleeding: S=Small, M=Medium, H=High.

In Table I, it may be seen that birds receiving phenyl 2-cyanoallyl-dithiocarbamate were superior in weight gain and reduced mortality over those birds receiving sulfa-

EXAMPLE VII.—Summary of effectiveness of cyanoallyl dithiocarbamates as soil fungicides Indicator plants are planted in soil containing root infecting plant pathogens. Prior to planting the soil is treated at several concentrations of the candidate material. After three weeks the roots of the plants are washed and indexed to estimate the relative effectiveness of the various treatments. Table II summarizes the data for representative compounds of the invention.

TABLE II
*Summary of soil fungicity evaluation of dithiocarbamates*

$$CH_2=\overset{CN}{\underset{|}{C}}-CH_2-\overset{H}{\underset{|}{N}}-\overset{S}{\underset{||}{C}}-S-R$$

| R | min. effective dose (p.p.m.) for complete control of following organisms | | | |
|---|---|---|---|---|
| | Thielaviopsis | Fusarium | Rhizoctonia | Pythium |
| —C₆H₅ | 5 | 1.25 | 5 | 1.25 |
| —C₆H₄—Cl | 25 | 1.25 | 1.25 | 1.25 |
| —C₆H₄—Br | 12 | 12 | 12 | 12 |
| —C₆H₄—CH₃ | 25 | 25 | 25 | 25 |
| —C₆H₄—CH(CH₃)₂ | 12 | 12 | 12 | 12 |

It is to be understood that this invention is not to be limited to the exact details of operation shown and described, as obvious modifications and equivalents will be apparent to one skilled in the art and the invention is, therefore, limited only by the scope of the appended claims.

I claim as my invention:

1. Aryl 2-cyanoallyl-dithiocarbamates of the formula:

$$CH_2=\overset{CN}{\underset{|}{C}}-CH_2-\overset{H}{\underset{|}{N}}-\overset{S}{\underset{||}{C}}-S-R$$

wherein R represents a member selected from unsubstituted aryl of 6–14 carbon atoms and aryl of 6–14 carbon atoms substituted by from one to a plurality of substituents of the group consisting of middle halogen, alkyl of 1–5 carbon atoms, alkoxy of 1–5 carbon atoms, hydroxy, nitro, amino (—NH₂), monoalkylamino of 1–4 carbon atoms, and dialkylamino of 2–8 carbon atoms.

2. Aryl 2-cyanoallyl-dithiocarbamates of the formula:

$$CH_2=\overset{CN}{\underset{|}{C}}-CH_2-\overset{H}{\underset{|}{N}}-\overset{S}{\underset{||}{C}}-S-R$$

wherein R is unsubstituted aryl of 6–14 carbon atoms.

3. Phenyl 2-cyanoallyl-dithiocarbamate.
4. p-Chlorophenyl 2-cyanoallyl-dithiocarbamate.
5. p-Bromophenyl 2-cyanoallyl-dithiocarbamate.
6. o-Tolyl 2-cyanoallyl-dithiocarbamate.
7. o-Cumenyl 2-cyanoallyl-dithiocarbamate.

No references cited.

CHARLES B. PARKER, *Primary Examiner.*
B. BILLIAN, *Assistant Examiner.*